Patented Feb. 6, 1940

2,188,895

UNITED STATES PATENT OFFICE 2,188,895

STABLE ZEIN SOLUTION

Roy E. Coleman, Meriden, Conn., assignor, by mesne assignments, to The Zein Corporation of America, a corporation of Delaware No Drawing. Application August 9, 1937,
Serial No. 158,211

2 Claims. (Cl. 134—12)

This invention relates to substantially non-aqueous stable solutions of the prolamins; and more particularly, to stable solutions produced by the direct solution of the prolamins in relatively high boiling, substantially non-aqueous solvents. The solutions produced in accordance with my invention are stable at 70° F. and have a decidedly less tendency to gel, or to separate on standing even when cooled to temperatures of 50 to 70° F. and slightly below, than the known solutions of the prolamins.

In the following description of my invention I will refer to the preparation of substantially non-aqueous stable solutions of zein derived from corn, but it is of course to be understood that my invention is also applicable to the preparation of solutions of the other prolamins such as, for example, gliadin from wheat, hordein from barley, kafirin from kafir and the prolamins from other cereal grains. The above-mentioned prolamins are at present derived by extraction with an aqueous alcohol solution in which the added water varies generally from about 15 to 40% of the solvent mixture. The material used in accordance with my invention is the dried extract which may be completely dry or the commercial product which contains a small percentage of moisture.

In accordance with the prior art, solution of zein in an organic solvent may be effected only by the addition of water to the solvent. Thus, zein has been found to be soluble in aqueous alcohol as well as in aqueous solutions of other low-boiling alcohols such as, for example, methanol, butanol, isopropanol and the like. Zein has also been found to be soluble in aqueous solutions of the alcohol ethers such as ethylene glycol monoethyl ether, ethylene glycol monobutyl ether and the like and in alcohol derivatives such as diacetone alcohol. As stated in the patent to Walsh et al. No. 1,966,604, July 17, 1934, according to the prior art the addition of water is necessary since the low molecular weight alcohols, the alcohol ethers and the alcohol derivatives are not effective alone for the purpose of producing solutions of zein. According to the prior art also, the amount of added water necessary to effect solution of zein in the low molecular weight alcohols, alcohol ethers and alcohol derivatives varies from about 5 to 60% and preferably from about 15 to 60%.

The prior art solutions of zein in the aqueous low-molecular weight alcohols, alcohol ethers and alcohol derivatives wherein added water is employed to effect solution, are not stable over a wide range of concentrations so far as separation is concerned, especially on standing and at temperatures below 70° F. Solutions of such concentrations which do not separate have a definite tendency to form a gel on standing. This tendency to form a gel is largely independent of the temperature but may be influenced thereby.

In accordance with my present invention, I have found that stable solutions of zein in relatively high boiling substantially non-aqueous solvents can be formed directly without the addition of any water. The relatively high boiling substantially non-aqueous solvents embodying my invention may suitably be one of the class of glycols such as for example, diethylene glycol, ethylene glycol, triethylene glycol, propylene glycol and the like and preferably those of higher molecular weight than ethylene glycol or any mixture of these glycol solvents. The solutions of zein in these direct solvents are stable on standing at temperatures of 80° F. and below and do not separate even when cooled to temperatures of from about 5 to 60% and preferably from about 15 to 60%.

The prior art solutions of zein in the aqueous low-molecular weight alcohols, alcohol ethers and alcohol derivatives wherein added water is employed to effect solution, are not stable over a wide range of concentrations so far as separation is concerned, especially on standing and at temperatures below 70° F. Solutions of such concentrations which do not separate have a definite tendency to form a gel on standing. This tendency to form a gel is largely independent of the temperature but may be influenced thereby.

In accordance with my present invention, I have found that stable solutions of zein in relatively high boiling substantially non-aqueous solvents can be formed directly without the addition of any water. The relatively high boiling substantially non-aqueous solvents embodying my invention may suitably be any one of the class of glycols such as for example, diethylene glycol, ethylene glycol, triethylene glycol, propylene glycol and the like and preferably those of higher molecular weight than ethylene glycol or any mixture of these glycol solvents. The solutions of zein in these direct solvents are stable on standing at temperatures of 80° F. and below and do not separate even when cooled to temperatures of 50 to 70° F. and somewhat below. These solutions when cooled to temperatures as low as 10° above zero or to zero and below, may separate or become solid; however, on heating again to temperatures of from 35° to 70° F., a re-solution is effected either without or with slight stirring and the solutions returned to their normal form at the reheating temperatures. The stable solutions embodying my invention are characterized by the fact that they do not separate at the temperatures stated, have a decidedly less tendency to thicken and gel than solutions containing added water and in that they contain no added water and are, therefore, substantially non-aqueous.

In carrying out my invention the zein or other prolamin is mixed with any one of the direct glycol solvents such as, for example, diethylene glycol or mixture of direct glycol solvents. The mixing may be carried out in any suitable vessel or container such as, for example, a beaker or kettle, usually with some stirring and with the application of heat in the order of about 125° to 200° F. and higher. A stable solution of the zein in these direct glycol solvents is obtained generally in about 5 to 25 minutes and in most instances satisfactory stable solutions have been obtained in about 5 to 15 minutes with the utilization of heat in the order of about 180° F.

The quantity of direct glycol solvent employed to effect solution of the zein may vary from about 1 to 20 or more and preferably 2 to 9 or more parts by weight of the solvent to 1 part by weight of the zein. In most instances 2 to 5 parts by weight of the solvent to 1 part by weight of the zein have been found sufficient to effect the desired formation of the stable solutions of the zein in the direct solvent; however, the most practical working solutions have been obtained with the aid of 3 or 4 parts by weight of the solvent to 1 part by weight of the zein. It is, of course, obvious that the viscosity of the solution obtained in accordance with my invention is dependent on the quantity of solvent used.

The stable solutions obtained in accordance with my invention may, if desired, be diluted with any suitable, compatible diluent such as, for example, ethanol, denatured alcohol, dioxan, dichlorethylether and the like or with any of the auxiliary solvents or alcohol-containing auxiliary solvents as specified in my copending application "Process of producing stable zein solutions with auxiliary solvents" Serial No. 158,210, filed August 9, 1937. These solutions may also be diluted with any of the conventional and well-known lacquer solvents. The choice and quantity of diluents used for the purpose of effecting dilution of the stabilized solutions is of course influenced by the purpose intended, the properties desired and the peculiar dilution characteristics of the specific diluent utilized.

The following examples are illustrative of the methods embodying my invention and it is to be understood that the direct glycol solvents and the proportions thereof mentioned in the examples are merely illustrative since other proportions may be employed and other glycol solvents may likewise be used. In these examples, the term "parts" indicates parts by weight.

Example 1

10 parts of zein are mixed with 30 parts of diethylene glycol in a suitable vessel. On stirring the mixture at room temperature the zein is converted into a viscous, translucent, semi-plastic mass. On the application of heat in the order of about 150° F. and with continued stirring, a clear, stable solution of the zein in the diethylene glycol is obtained in about 5 to 10 minutes.

Example 2

10 parts of zein are mixed with 40 parts of triethylene glycol. On stirring and with the application of heat in the order of 140° to 150° F., a clear, stable solution of the zein in the solvent is obtained in about 6 to 12 minutes.

Example 3

10 parts of zein are mixed with 40 parts of propylene glycol. On stirring and with the application of heat in the order of 130–140° F., a clear, bright, stable solution of the zein in the solvent is obtained in about 5 to 10 minutes.

Example 4

10 parts of zein are mixed with 20 parts of ethylene glycol and 20 parts of diethylene glycol. On stirring and with the application of heat in the order of about 185 to 195° F., a clear, stable solution of the zein in the solvent mixture is obtained in about 8 to 12 minutes.

In the claims, when I use the expressions "substantially non-aqueous" solutions and "stable" solutions, I refer to solutions of zein in ethylene glycol which, when the concentration of zein in the glycol varies from about 1 part by weight of the zein to about 1 to 9 or more and preferably 2 to 9 or more parts by weight of the glycol solvent, are stable at 70° F. and do not separate on standing or even when cooled to a temperature of 50° to 70° F. and somewhat lower, and have a decidedly less tendency to thicken and gel than solutions containing added water.

I claim:

1. A substantially non-aqueous zein solution comprising zein and ethylene glycol, said solution having not in excess of about 5% of added water and being stable against separation of the zein at a temperature of 70° F.

2. A substantially non-aqueous zein solution comprising one part by weight of zein and at least two parts by weight of ethylene glycol, said solution having not in excess of about 5% of added water and being stable against separation of the zein at a temperature of 70° F.

ROY E. COLEMAN.